FIG. III

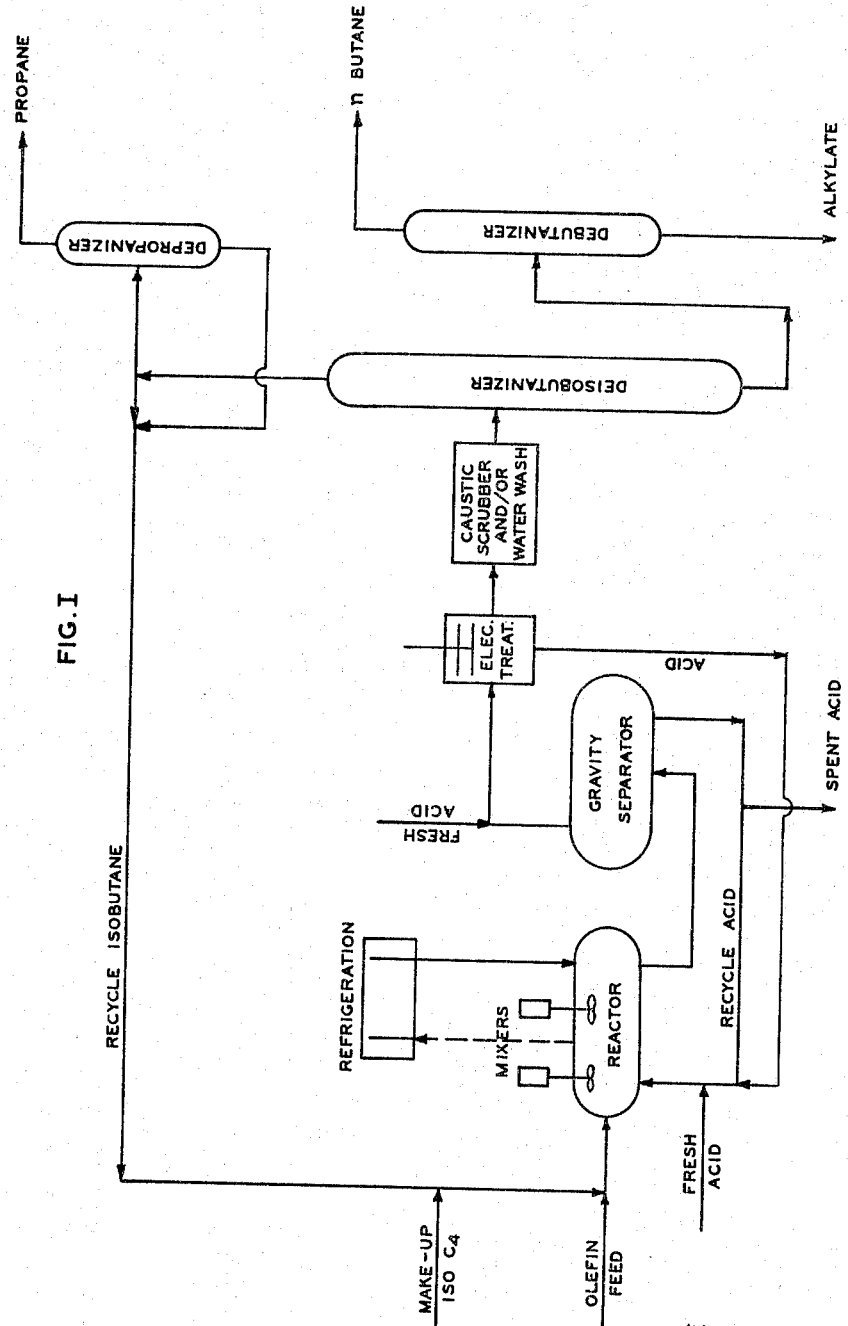

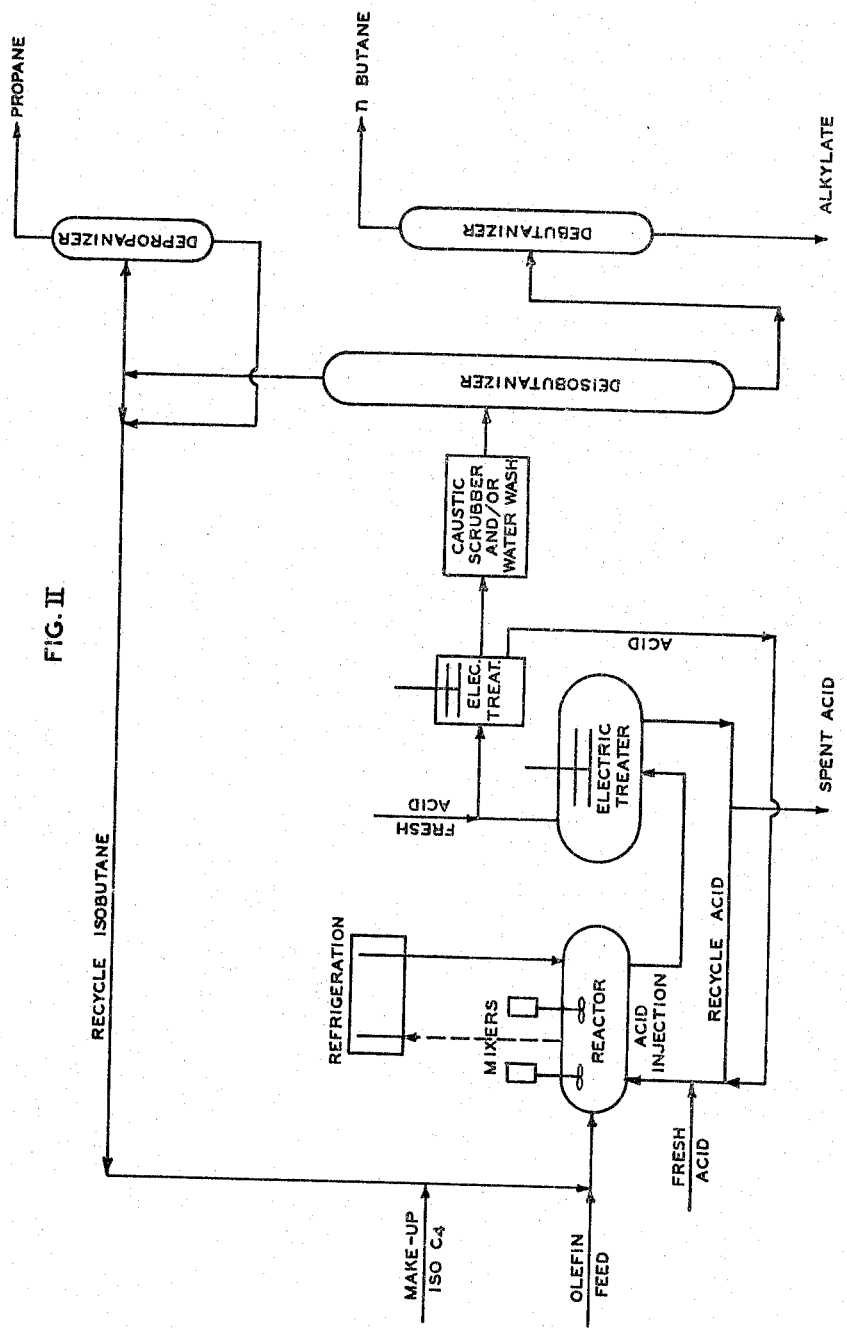

INVENTORS
ROBERT BRUCE MARTIN
LOGAN C. WATERMAN

By

ATTORNEY

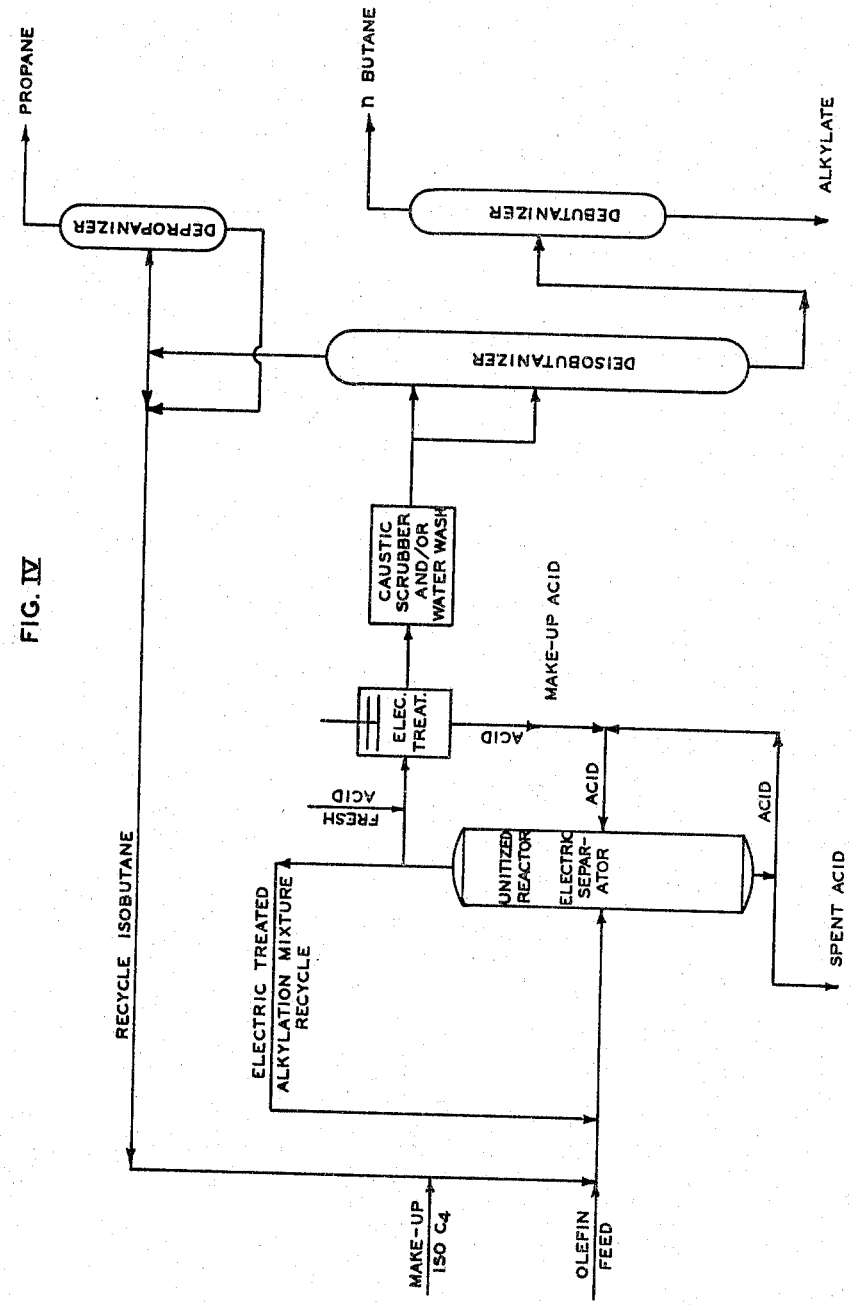

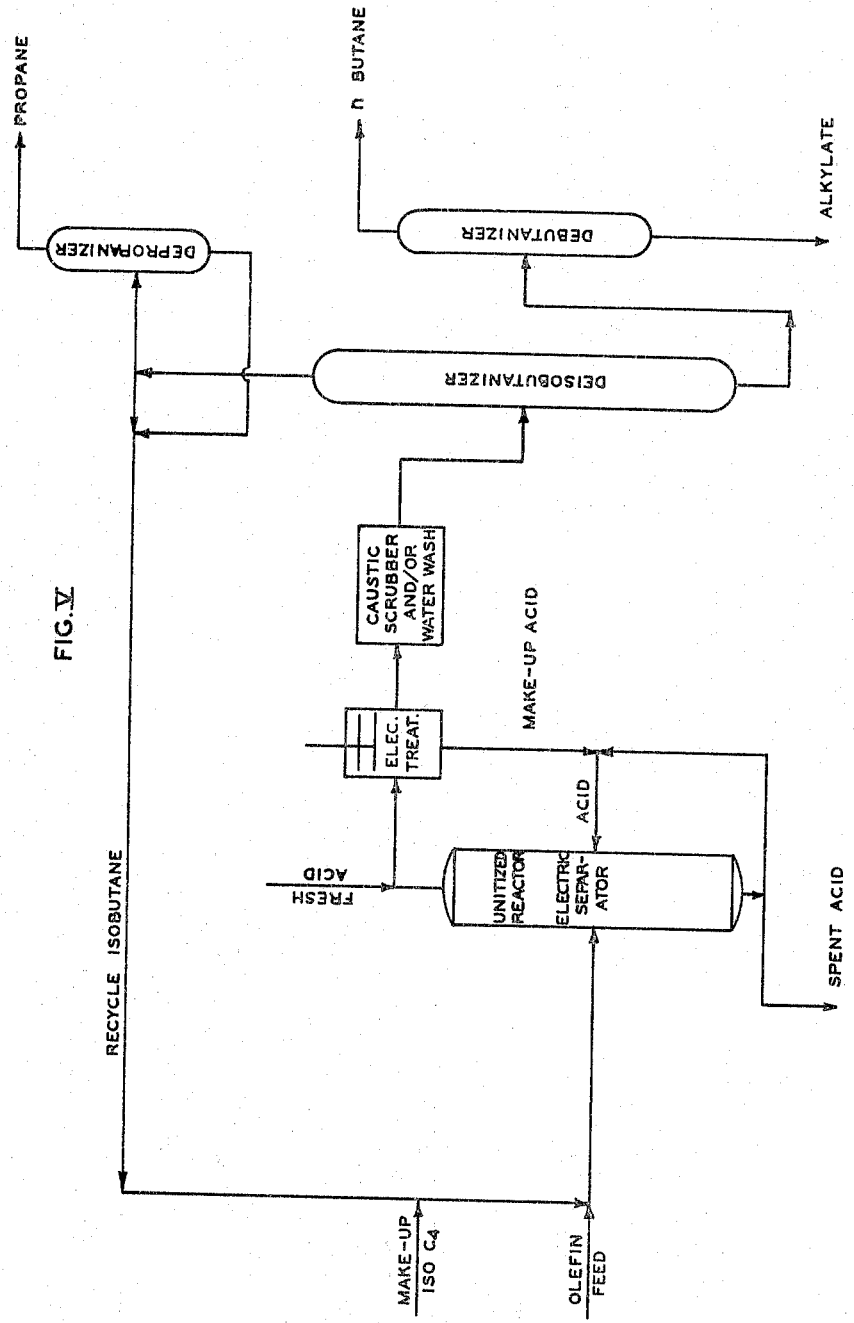

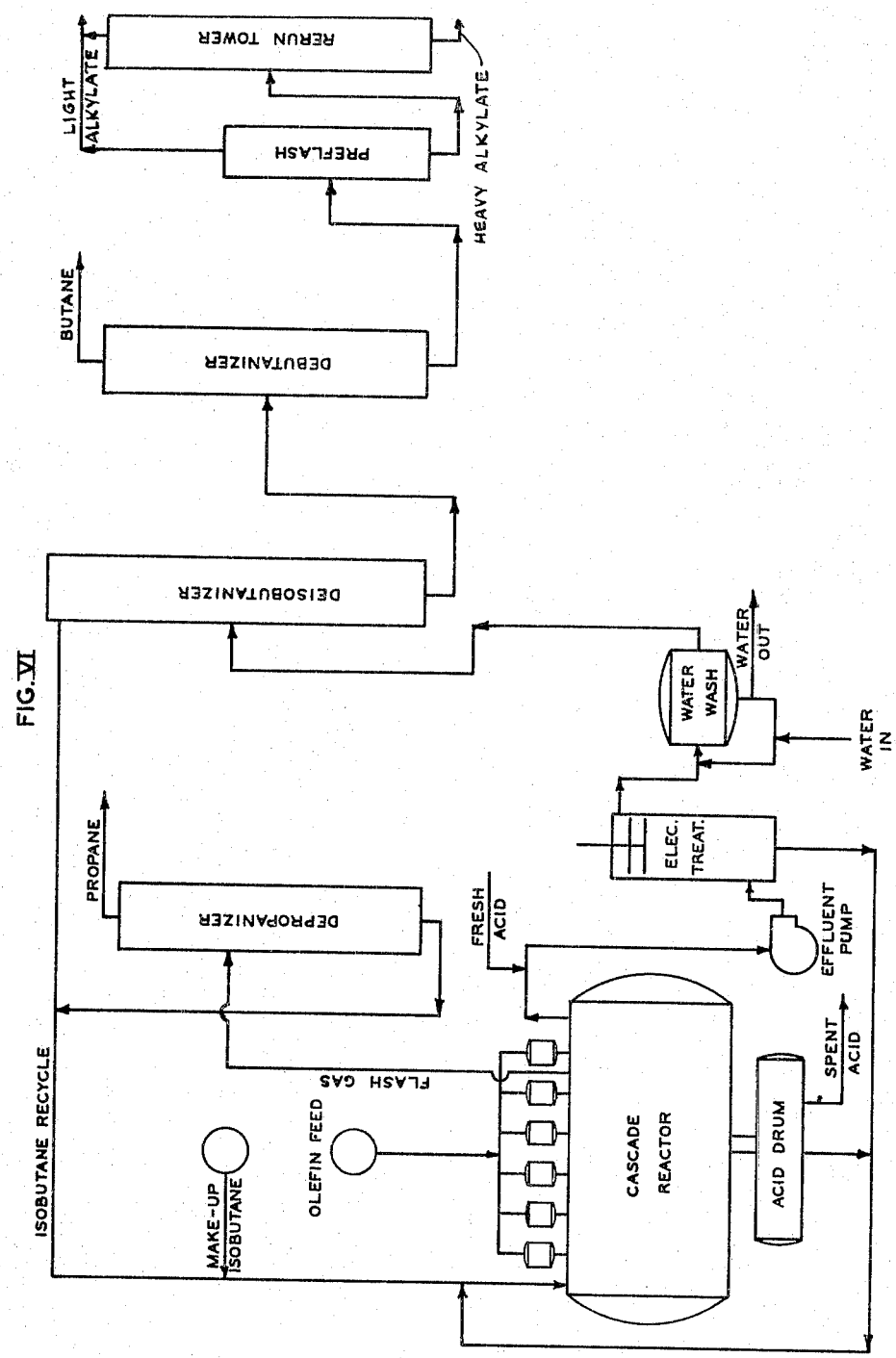

United States Patent Office 3,325,391
Patented June 13, 1967

3,325,391
HYDROCARBON PURIFICATION
Logan C. Waterman, Houston, and Robert Bruce Martin, Bellaire, Tex., assignors to Petrolite Corporation, Wilmington, Del., a corporation of Delaware
Filed Dec. 6, 1963, Ser. No. 328,574
9 Claims. (Cl. 204—190)

This invention relates to a process of reducing the sulfur content of hydrocarbons which have been treated with sulfuric acid. More particularly, this invention relates to a process of reducing the alkylsulfate content, such as the monoalkyl and particularly the dialkyl sulfate content, of hydrocarbons.

Hydrocarbons contaminated by the presence of even small proportions of sulfur-containing compounds such as alkyl sulfates have proved extremely difficult to handle in chemical processes occurring at elevated temperatures. The equipment used to conduct such high-temperature processes is observed to undergo rapid and severe corrosion and deterioration leading to high costs of maintenance and replacement. It is believed that in subjecting such hydrocarbons to increased temperatures alkyl sulfates are decomposed into acidic materials which foul and corrode the process equipment.

This problem is well illustrated by the difficulties encountered in the fractional distillation of hydrocarbons produced (1) by acid treatment of naphthas, or (2) by alkylating a lower olefin with a lower isoparaffin, using sulfuric acid as the catalyst in each instance, to separate a fraction boiling in the gasoline range.

Alkyl sulfates which are produced in varying amounts in these processes and are retained in minor proportions, for example from about 0.1% or less to about 1% or more by weight of alkylate in the hydrocarbon products, and are subsequently decomposed to acidic materials during distillation, thereby resulting in serious fouling and corrosion of the distillation equipment and adding materially to the expense of processing.

We have now discovered a process whereby substantially quantitative removal of contaminating sulfur-containing compounds, such as alkyl sulfates, may be effected from hydrocarbon stocks with the consequence that the hydrocarbon may be subjected to chemical processing at elevated temperatures, such as fractional distillation, without the formation of injurious acidic materials which foul and corrode the equipment used. More particularly, we have now discovered that the soluble sulfur bodies in hydrocarbons which have been treated with sulfuric acid can be reduced by washing said hydrocarbons with fresh concentrated sulfuric acid in the presence of an isoparaffin and then subjecting this product to an electric field.

In addition, we have discovered that in addition to processing advantages, the products formed by this invention are unexpectedly improved. For example, alkylates so treated have improved properties, particularly as to color, quality, octane number, etc. This improvement is such that heavy alkylates can be used in gasoline blends or as special solvents.

Stated another way, the process of this invention improves both the process and the product.

Alkylation processes include the alkylation of paraffins, isoparaffins, aromatic compounds, cycloaliphatic compounds, etc. with olefins or their equivalents. The alkylation reaction may take place over a wide range of temperatures ranging from below 0° F. when alkylating isoparaffins to as high as about 600° F. when certain aromatic compounds are reacted with olefins. It may be conveniently carried out under pressures at or below atmospheric or as high as several hundred atmospheres.

The major alkylation process in use today involves the reaction of isoparaffins with olefins in the presence of an acid catalyst to form valuable high octane gasoline components. The isoparaffins used may be isobutane, isopentane, isohexane, etc., or mixtures thereof. Olefins more often reacted are propylenes, butylenes, pentylenes, their isomers, and mixtures thereof. In addition, one may utilize any proportions of the above as feed stocks as well as mixtures of isoparaffins and olefins with or without the presence of normal paraffins.

Various methods of preparing high octane alkylates by reacting olefins with paraffins, such as isoparaffins, are known. These methods include liquid phase catalytic alkylations with concentrated sulfuric acid. In general these methods are carried out by adding an olefin to an excess of an isoparaffin hydrocarbon emulsified in the catalyst. Excess isoparaffin is separated after alkylation and recirculated. Sufficient pressure is employed during the process to keep the reactants in the liquid phase.

In a typical commercial alkylation, isobutane and the acid catalyst are introduced into an alkylation reaction zone, and are violently agitated to form an emulsion, this being the preferred method of assuring intimate contact between the acid catalyst and the hydrocarbon to be alkylated. Inasmuch as the reaction occurs at the liquid-liquid interface, it is necessary to provide violent agitation and intimate contact if the desired reaction is to take place. The major portion of the isobutane feed is provided by a recycle stream obtained from subsequent distillation steps; any additional quantity of isobutane required, for example that amount needed to start up the unit, is usually supplied from an independent source. The agitation may be provided in a number of ways. Usually a conventional mixer or pump provides a means for creating and moving the emulsion at high velocity and also for circulating the emulsion in the contact zone. The alkylation reaction may be carried out in one step, although more usually several steps in series are provided, with a portion of the olefin reactant being admitted to each stage and contacting isobutane passing serially through the successive stages. The alkylation feed which contains olefin reactant also contains isobutane, butylene, propane, propylene, and frequently small quantities of lighter paraffins. The temperature in the reaction zone is maintained at a constant low level by vaporizing therefrom the lighter components in the reaction products, more usually a mixture of butane, isobutane, propane, and any lower boiling compounds. Because of the high concentration of isobutane in the reactor liquid these vapors are predominantly isobutane. The vapors are compressed and condensed, and the condensate after the removal of propane and the lighter components is returned to the alkylation reaction zone in the isobutane recycle. In addition, or alternatively, external mechanical or absorption refrigeration can be employed.

The alkylation mixture leaving the last reaction stage, comprising a mixture of alkylate, acid and unreacted hydrocarbons, passes into a settling zone wherein contaminated acid catalyst, containing polymers and other impurities, is separated from the alkylate and unreacted isobutane. A portion of the contaminated acid is recycled to the contacting zone and the remainder is either purified for reuse, used in another process where a high degree of purity is not required, or is discarded. Alkylate and unreacted isobutane are further processed to separate the alkylate and the isobutane which is recycled to the contacting zone.

Certain alkylation systems charge commercial mixtures of paraffins and commercial mixtures of olefins which consist primarily of paraffins and olefins having about 3–6 carbon atoms, for example propylene and/or propane, butenes and/or butanes, pentenes and/or pentanes, hexenes and/or hexanes, isomers thereof, etc.

In commercial processes of alkylation the ratio of isoparaffin to olefin is kept high in order to increase the alkylation of the olefin and to suppress polymerization of the olefin. Excess isoparaffin is purified and separated after alkylation and then recycled.

In the conventional alkylation process, after the separation of the acid, the hydrocarbon product is scrubbed with caustic and/or water and the resulting product separated into alkylate and volatile fractions from which isobutane is recycled. Since large excesses of isobutane are employed, large separation and distillation equipment must be employed which increases the cost of alkylation. Stated another way, because of the large excess of isoparaffin employed, it is necessary to recycle the isoparaffin to maximize yields. However, if the alkylation mixture is recycle without fully removing sulfuric acid from the hydrocarbon mixture, side reactions occur since reaction continues as long as sulfuric acid is present therein. Since separation is affected in a typical commercial operation by the gravitation, removal of the acid from the hydrocarbon phase is slow and incomplete. In order to maximize the yield of desired product, contact time must be short. In order to achieve this, it is necessary to remove sulfuric acid after the desired reaction time exposure is completed, such as by means of settling and caustic and/or water scrubbing. Thereupon, the alkylate is separated from the volatile components and isobutane is recycled. Because of the large excesses of isobutane employed, a large investment in separation and distillation equipment is required.

In application S.N. 174,735 to Samuelson, now U.S. Patent No. 3,239,578, granted on Mar. 8, 1966, there is described a method of alkylation which avoids the problems associated with the use of massive volumes of alkylation catalyst and the absence of emulsion breaking control which comprises reacting an olefin with an isoparaffin in the presence of a dispersed catalyst wherein the hydrocarbon phase is the continuous phase of said dispersion; and then subjecting the resulting product to an electric field. Samuelson's process uses substantially less acid by "making a little acid go a long way" since the acid now functions as a low volume rather than as a massive volume catalyst. This is effected by finely dispersing catalytic amounts of acid in the reaction medium, preferably in the isoparaffin so that the effective catalytic surface area of the acid, which effects reaction between the isoparaffin and the olefin, is maximized. However, the more dispersed the acid the more difficult is the final separation of the acid from the reaction mixture since finely divided particles do not readily settle on standing. By employing an electric field in conjunction with these fine dispersions of acid, the reaction time is more readily controlled since the application of an electric field, by effecting removal of the catalyst, stops the reaction and thus minimizes undesirable side reactions. In addition, rapid removal of the catalyst by the electric field decreases the time required to allow the catalyst to settle, permitting faster throughput. Thus, Samuelson's process permits the advantages of a finely dispersed catalyst without the disadvantages associated therewith since an electric field solves demulsification problems generally inherent in a system containing finely dispersed particles.

Thus, Samuelson's process (1) requires lesser volumes of sulfuric acid, (2) requires a smaller reactor, (3) results in fewer side reactions during alkylation, (4) reduces the disposal problem associated with larger volumes of spent sulfuric acid since lesser amounts of catalyst yield greater amounts of alkylate as compared to prior processes, etc. and (5) facilitates demulsification upon completion of the reaction.

In its broadest aspects, Samuelson's invention relates to an alkylation process characterized by (1) a dispersion or emulsion of alkylation catalyst in the hydrocarbon phase so that a hydrocarbon continuous phase is maintained in the system (2) the treatment of said hydrocarbon continuous system with an electric field upon completion of alkylation.

In application Ser. No. 309,471 to Cole, now U.S. Patent No. 3,243,474, granted on Mar. 29, 1966, there is described a process of alkylation employing an electric field wherein the electrically treated alkylation mixture is recycled directly into the alkylation reaction without further purification.

In application Ser. No. 309,484, filed Sept. 17, 1963 to Lucas, now abandoned, there is described a process of alkylation employing an electric field where a unitized reactor is employed, i.e., both alkylation and electric treatment takes place in the same vessel.

All of the above applications are, by reference, incorporated in the present application.

In the above processes it is noted that subsequent to alkylation, sulfuric acid is separated from the hydrocarbon phase of the alkylate by any suitable means, such as gravitation, electrical treatment, etc. Thereupon minor amounts of sulfuric acid, which remain in the hydrocarbon, may be removed by a caustic and/or water wash. However, it has been found that neither gravitation separation, electrical separation, etc., with or without a caustic and/or water wash, is capable of removing substantially all of the sulfur-containing bodies of the alkylate, particularly the non-acidic components which are soluble in the alkylate. Since the sulfur-containing bodies are not fully removed from the alkylate, severe fouling and corrosion in the downstream fractionation equipment are experienced. In addition, the presence of sulfur compounds in the alkylate lowers the quality of the product.

We have now discovered that the presence of soluble sulfur bodies in the alkylate can be reduced by washing the alkylate with fresh concentrated sulfuric acid and then subjecting this product to an electric field.

By "fresh concentrated sulfuric acid" we mean that the alkylated product is washed with sulfuric acid having, for example, a concentration of at least about 88%, such as about 88 to 100%, but preferably about 93 to 98%. In practice commercial concentrated sulfuric acid is employed. Lower concentrations tend to decompose the hydrocarbon. The term "fresh" means that sulfuric acid from which the alkylate is separated is not employed since it contains contaminants which one desires to extract from the alkylate. Therefore, in practice fresh sulfuric acid is employed. However, sulfuric acid containing minor amounts of impurities or impurities that do not interfere with the extraction process can also be employed. The above concentrations are based on weight concentration of sulfuric acid in water.

Intimate contact or washing of the alkylate with fresh sulfuric acid can be achieved by any suitable means such as, for example, pumps, jet injectors, agitating and circulating devices, etc., as well as more drastic dispersing means such as ultrasonics, colloidal mills, etc. High voltage electric fields can also be employed to create the emulsions or dispersions to be employed in the washing operation.

The agitation employed in washing should be sufficient to effectively remove the sulfur-containing impurities from the alkylate. Increased agitation generally improves the results obtained, and the ultimate limit in this regard will be determined by economic considerations, in view of the power consumption required to improve agitation sufficiently to effect an improvement in yield or quality of the alkylate and the difficulties which may be encountered in separating a very finely divided and relatively stable emulsion. Since an electrostatic field can break a "tight emulsion," very fine dispersions of minor amounts of sulfuric acid can be used.

We have found that minor amounts of fresh sulfuric acid can be employed in removing the sulfur-containing impurities such as volume ratios of acid to hydrocarbon of about .01 or lower to about 0.05 or higher. Because of the effectiveness of electric treatment in removing traces of acid low ratios of acid to hydrocarbon can be employed. In certain instances it may be desirable to employ higher ratios such as about 0.1 to 20 or higher, for example about 0.5 to 10. However, we generally prefer to operate employing amounts such as a ratio of 1 or lower. We have unexpectedly found that trace amounts of sulfuric acid are effective in removing said impurities. These trace amounts are difficult to separate by gravitational means and are only made commercially operative by employing an electric field.

In general, during the fresh sulfuric acid washing step ambient temperatures are employed, for example, from 30° F. or lower, to 150° F. or higher. Usually a temperature range of 40–60° F. is employed. Generally pressure sufficient to keep all reactants in a liquid phase is maintained.

The alkylate treated with fresh sulfuric acid is now passed into the electric treater where it is subjected to an electric field of sufficient voltage to separate the acid therefrom. Voltages capable of effecting this will vary depending on many variables. Voltage gradients employed are in the range of about 1–50 kv./in., or higher, such as about 5–40 kv./in., for example about 10–30 kv./in., but preferably about 20–25 kv./in. Both alternating and direct currents can be employed, but preferably direct current. A wide variety of electric treaters can be employed, for example, those disclosed in U.S. Patent 2,897,251, 2,976,228 and elsewhere.

The electrically treated alkylate enters the caustic scrubber and/or water wash where the small amounts of acid remaining in the hydrocarbons are neutralized or washed out with aqueous alkali and/or water. However, by employing a very effective electrical treater in the process, the scrubber may be omitted from the process. In other words, in certain instances where an effective electric treater is employed, scrubbing is optional.

This invention is illustrated in the drawing which presents flow sheets wherein the process of this invention is employed.

FIG. I presents the application of the present invention to a general alkylation process of the prior art (compare with FIG. I of S.N. 309,471 to Cole).

FIG. II represents the application of the present invention to the alkylation process of Samuelson S.N. 174,735 (compare with FIG. II of S.N. 309,471 to Cole).

FIG. III represents the application of the present invention to the alkylation process of Cole S.N. 309,471 (compare with FIG. III of said Cole application).

FIG. IV represents the application of the present invention to the alkylation process of Lucas S.N. 309,484 (compare with FIG. III of said Lucas application).

FIG. V represents the application of the present invention to the alkylation process of Lucas S.N. 309,484 employing no alkylation mixture recycle (compare with FIG. IV of said Lucas application).

FIG. VI represents the process of the illustrative example which is presented in detail to illustrate the advantages of the present invention.

It should be noted that the caustic scrubber and/or water wash in all of the above flow sheets may be omitted where very effective electrical treatment is employed.

EXAMPLE

The following example is presented to illustrate the improvements effected by the present invention. This is illustrated by the Flow Sheet shown in FIG. VI.

A Kellogg type cascade sulfuric acid alkylation unit was installed in a refinery about 1956. Corrosion and fouling problems were experienced during the entire operating period of the unit. Most of the fouling problems occurred in the deisobutanizer and rerun reboilers and towers. The rerun section was a continuous source of difficulty. The tower and reboiler had to be steamed an average of twice a week, and the unit had to be shut down about twice a month to wash the entire rerun section. To combat the fouling problems $59.43/day of chemicals had been injected into the equipment. Monoethanolamine was used to control the overhead water pH on both the deisobutanizer and rerun towers. A corrosion inhibitor was used in both the deisobutanizer and rerun towers, and a chemical antifoulant was added to the deisobutanizer charge and stayed with the alkylate through the fractionation processes. Caustic was injected into both the deisobutanizer and rerun charge.

The neutralization effluent stream indicated that strong fouling conditions existed. The quality analysis of the total light and heavy alkylate indicated that sulfur compounds were adversely affecting the lead response. Of special note, the heavy alkylate showed a clear octane of 80 and a lead octane (+3 cc. TEL) of 80½.

The quantity of isobutane recycle was limited by a dirty tower and reboiler, and at times fractionation was severely upset.

Faced with these problems we proposed to employ the present invention to produce a non-fouling, low sulfate alkylate.

Thereupon, a 6 ft. 6 in. electrical precipitator was installed on the 15,000 b./d. reactor effluent stream of a Kellogg cascade alkylation unit following the effluent pump at the refinery. The stream consisted of about 85% isobutane, 4% butane and 11% alkylate. The alkylation unit olefin feed consisted of 54% butylene, 34% propylene and 12% amylene.

Fresh sulfuric acid was injected into the suction of the reactor effluent pump. The electrically precipitated acid was returned to the alkylation unit as the fresh acid makeup. The acid rate was established by the fresh acid requirements of the unit.

The effluent oil from the acid precipitator was neutralized in a gravity system, employing water recycling on a fifty volume percent basis with about ten percent makeup. Caustic was added to the water to control the effluent pH at about 8.5. The effluent oil from this system was then processed to the deisobutanizer. A system of exchangers before the water wash section held the temperature at about 110° F.

The stream temperature of the acid precipitator ranged between 52° and 56° F.

The optimum operating conditions for the electrical treater in this system were as follows:

Flow rate, b./d. _____ 15,500.
Operating temp., °F. _____ 52 to 56.
Operating pressure, p.s.i. _____ 250.
Fresh acid rate, b./d. _____ 90 to 100.
Acid emulsion, vol. percent acid _____ 0.66.
Mixing _____ Reactor pump.
Applied voltages, kv./in. _____ 25.
Milliamps _____ 0.

After a period of operation of one week monoethanolamine used for overhead water pH control was eliminated. The resulting overhead water pH on both the desisobutanizer and rerun towers averaged 7.5 to 8.5. The antifoulant was eliminated and the corrosion inhibitor was reduced to about one gallon/day. The total caustic consumption was reduced about one-half. The original caustic consumption was about 0.011 lb./bbl. which is considered usually low for a unit of this type.

Alkylate resulting from the process had the following quality increases:

(1) The total alkylate performate number (3 cc. TEL) was increased two numbers (101 to 103 approx.).
(2) The light alkylate performance number (3 cc. TEL) was increased from ½ to 1 number (145 to 146 approx.).

(3) The heavy alkylate performance number (3 cc. TEL) was increased 15 numbers. (Originally the clear octane was 80 and 3 cc. TEL increased this value to 80½; now the leaded octane is about 95½.)

(4) The total sulfate content of the heavy alkylate is about 50 p.p.m. (The total sulfate content of the heavy alkylate had been near 500 p.p.m.)

The fresh acid treated alkylate when laboratory treated with alumina catalyst indicated that the fresh acid was doing a maximum job of removing the sulfur which affects lead response. The leaded octanes, before and after catalyst contact, were practically identical.

Flask reaction tests showed little or no improvement until the fresh sulfuric acid was used. At that time, a clear flask was obtained directly from the electric treater and before neutralization. A clear flask had never been seen in the refinery before.

The heavy alkylate color started improving with the use of the fresh acid. It jumped from a +8 to a +16 in the first 24 hours. It is expected that the color will reach a +30 when the unit is clean.

With the lower sulfur content, improved color and odor, the heavy alkylate can be used as odorless solvent.

The economic justification for employing the present invention can be based on (1) chemical savings, (2) maintenance savings, and (3) alkylate quality increase.

(1) Chemical savings:

(A) Before electric fresh acid wash 1. 225 lbs. caustic/day _____ $ 6.91
2. 37 lbs. anti-foulant/day _____ 21.46
3. 71.2 lbs. monoethanolamine/day ____ 20.65
4. 29.5 lbs. corrosion inhibitor/day __ 10.41

Total _____ $59.43

(B) After electric fresh acid wash
1. 100 lbs. caustic/day _____ $3.07
2. 7.5 lbs. corrosion inhibitor/day _____ 2.62

Total _____ $5.69

Total chemical savings:

$59.43−$5.69=$53.74 per day (2) It is difficult to establish the cost savings in maintenance; however, the following data are known:
 1. The rerun reboiler and tower were steamed at least four times/week.
 2. The reboilers were washed and cleaned once a week.
 3. The alkylation unit was down an average of 8 hrs./mo. to wash and clean towers.
 4. The reboilers had to be retubed about six times a year.
 5. The return tower has been replaced.

(3) Alkylate quality increase:
 1. The light alkylate has a one performance number increase in leaded octane.
 2. The heavy alkylate has a fifteen performance number increase in leaded octane.
 3. The heavy alkylate could now be used directly in gasoline blending.
 4. The heavy alkylate can now be sold as a special solvent without further refining.
 5. The clean deisobutanizer and reboiler will allow a higher isobutane/olefin ratio which should result in acid savings.
 6. The whole alkylation unit operation has been smoothed out.

The effectiveness of the present invention is clearly shown in the following table in which Column I presents data obtained prior to the use of the present invention, and Column II represents data obtained employing the present invention in accord with the above example.

TABLE I

|  | Column I<br>Before Use of Present Invention | Column II<br>Employing Present Invention |
|---|---|---|
| Reactor Effluent Stream: |  |  |
| Total Acidity, p.p.m. $H_2SO_4$ | 40 to 60 | 60 to 80. |
| Total Sulfates, p.p.m. $H_2SO_4$ | 100 to 150 | 80 to 150. |
| Flask char value | 6 to 8 | 6 to 8. |
| Precipitator Effluent: |  |  |
| Total Acidity, p.p.m. $H_2SO_4$ |  | 3 to 7. |
| Total Sulfates, p.p.m. $H_2SO_4$ |  | 16 to 30. |
| Flask char value |  | Clean. |
| Water Wash Effluent: |  |  |
| Total Sulfates, p.p.m. $H_2SO_4$ | 55 to 90 | 6 to 13. |
| Flask char value | 4 to 8 | Clean. |
| Debutanizer Bottoms: Total Sulfates, p.p.m. $H_2SO_4$. | 50 to 90 | 4 to 10. |
| Heavy Alkylate: Total Sulfates, p.p.m. $H_2SO_4$. | Est. 500 | 50. |
| Total Alkylate Leaded Octane: |  |  |
| Raw sample | 101 | 103. |
| After Lab Treatment | 103 | 103. |
| Light Alkylate Leaded Octane: |  |  |
| Raw Sample | 145 | 146. |
| After Lab Treatment | 146 | 146. |
| Heavy Alkylated Leaded Octane: |  |  |
| Raw Sample | 80 | 95½. |
| After Lab Treatment | 90 | 95½. |
| Downstream Corrosion Protection Chemical Addition, $/day. | 59.43 | 5.69. |

From the above example it is evident that both the process and the products are improved by the present invention.

Among other things, the following advantages were obtained as a result of the present invention.

(1) Reduction in the quantity of neutralization caustic.
(2) Reduction in the quantity of fouling and corrosion in downstream equipment.
(3) Reduction or elimination in the need for neutralization chemicals and corrosion inhibitors in downstream equipment.
(4) A quality increase in the alkylate based on performance numbers by elimination of sulfur compounds.

Although the above example employs a cascade alkylation unit, the present invention can also be employed with other types of alkylation units, such as for example, the Stratco type unit, the Time-Tank type unit, etc.

The present invention is particularly applicable to the alkylation of isobutane with $C_3$, $C_4$, or $C_5$ olefins, or mixtures thereof, for the production of gasoline of high octane and quality. However, it is to be understood that the invention is applicable to the alkylation of any isoparaffin with any olefin. Thus, the isoparaffin may be isobutane, isopentane or isohexane. The olefin may be propylene, butylenes, pentylenes, hexylenes, other higher boiling monomeric olefins or certain selected fractions of cracked naphthas, olefin polymers such as di-isobutylene, tri-isobutylene, co-polymers of isobutylene and normal butylene such as the co-dimer, and various mixed polymers.

Moreover, the present invention is applicable to the alkylation of any organic compound having a readily replaceable hydrogen atom with any suitable alkylating agent. As stated above, the invention is of particular importance in the alkylation of an isoparaffin or other paraffin hydrocarbon having a tertiary carbon atom in the molecule, to enable a superior quality to be produced in large capacity. But the principles of the present invention are applicable to the alkylation of a normal paraffin, a naphthene or cycloparaffin, and an aromatic hydrocarbon, as well as or instead of the isoparaffin. In place of an olefin as the alkylating agent, various alkyl esters, such as the sulfates, chlorides, fluorides, etc. may be used. For example, the present invention can be employed in a two-stage absorption-alkylation process, wherein the olefin is obsorbed in acid in the first stage to produce the corresponding alkyl ester, and the ester either in solution in the absorbing acid or after separation therefrom as by isobutane or alkylate extraction, is then alkylated in the second stage in accordance with the present invention. Moreover, various aliphatic alcohols and ethers which are capable of forming olefins on reaction, such as tertiary butyl alcohol, isopropyl alcohol, butyl ether, etc. may be employed as the alkylating agent, particularly with catalysts which have tolerance for water liberated in the reaction.

The term "alkylatable compound" relates to any organic compound having a replaceable hydrogen atom which can be alkylated with an olefin or other suitable alkylating agent. The term "alkylating agent" relates to a material such as an olefin or its equivalent which is capable of alkylating said alkylatable compound. The term "alkylation catalyst" refers to an agent capable of effecting reaction between the alkylating agent and the alkylatable compound. The term "alkylation mixture" refers to the reaction product following alkylation. The reaction may be summarized as follows:

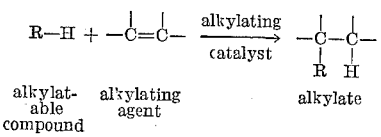

In summary, the present process is suitable for removing sulfur-containing compounds, such as alkyl sulfates and most particularly dialkyl sulfates, from hydrocarbons. In practice it may be employed in any process where such impurities pose a problem, such as in alkylation. The essence of the present invention does not reside in the details of the alkylation reaction nor the fractionation of the alkylate and the recycling of the unreacted components thereof, all of which is so well known to the art that details thereof would be redundant. The essence of the present invention resides in the application of the present invention, wherein sulfur-containing compounds, such as alkyl sulfates which are produced in known alkylation processes or in alkylation processes to be devised in the future, may be removed according to this invention. It may be employed also in conjunction with other processes besides alkylation where sulfur-containing compounds such as alkyl sulfate in hydrocarbons pose a problem.

During treatment with fresh concentrated sulfuric acid there should be at least sufficient isoparaffin, preferably the isoparaffin employed in alkylation process for example isobutane, to react stoichiometrically with the sulfur bodies present therein, calculated as dialkyl sulfate. However, in practice an excess of isoparaffin is employed, for example a volume ratio of isoparaffin to hydrocarbon, such as the alkylate, of from about 1 or less to about 500 or more, such as from about 5 to 50, but preferably about 5 to 20. In the case of the alkylation reaction one generally treats the alkylation mixture with fresh sulfuric acid after separation of the alkylation reaction sulfuric acid therefrom. This alkylation mixture contains the isoparaffin. A pressure is generally maintained in the system which is sufficient to keep all reactants in a liquid phase.

Having thus described our invention what we claim as new and desire to obtain by Letters Patent is:

1. A process of removing sulfur-containing bodies from a sulfuric acid treated hydrocarbon containing said sulfur-containing bodies comprising forming a mixture of said sulfuric acid treated hydrocarbon containing said sulfur-containing bodies and an isoparaffin, the amount of said isoparaffin being at least sufficient to react stoichiometrically with said sulfur-containing bodies present, calculated as dialkyl sulfate, washing said sulfuric acid treated hydrocarbon containing said sulfur-containing bodies in admixture with said isoparaffin with fresh concentrated sulfuric acid, and then subjecting said so-washed sulfuric acid treated hydrocarbon to an electric field of sufficient intensity to separate washing acid and sulfur-containing bodies therefrom.

2. A sulfuric acid catalyzed alkylation process wherein the improvement comprises washing the alkylate containing sulfur-containing bodies mixed with the alkylatable isoparaffin with fresh concentrated sulfuric acid and then subjecting said alkylate so mixed with said alkylatable isoparaffin to an electric field of sufficient intensity to separate washing acid and sulfur-containing bodies therefrom.

3. The process of claim 2 wherein the washing of the alkylate mixed with the alkylatable isoparaffin with fresh concentrated sulfuric acid is carried out at ambient temperature.

4. The process of claim 2 wherein the alkylatable isoparaffin is isobutane and the alkylating agent is a mixture of olefins consisting of 54 volume percent butylene, 34 volume percent propylene and 12 volume percent amylene.

5. The process of claim 2 wherein the alkylatable isoparaffin mixed with said alkylate is present in an amount at least sufficient to react stoichiometrically with said sulfur-containing bodies present, calculated as dialkyl sulfate.

6. A sulfuric acid catalyzed alkylation process wherein the improvement comprises separating the sulfuric acid catalyst from the alkylate mixed with the alkylatable isoparaffin, washing the alkylate mixed with the alkylatable isoparaffin with fresh concentrated sulfuric acid, and then subjecting said alkylate so mixed with said alkylatable isoparaffin to an electric field of sufficient intensity to separate washing acid and sulfur-containing bodies therefrom.

7. The process of claim 6 wherein the washing of the alkylate mixed with the alkylatable isoparaffin with fresh concentrated sulfuric acid is carried out at ambient temperature.

8. The process of claim 6 wherein the alkylatable isoparaffin is isobutane and the alkylating agent is a mixture of olefins consisting of 54 volume percent butylene, 34 volume percent propylene and 12 volume percent amylene.

9. The process of claim 6 wherein the alkylatable isoparaffin mixed with said alkylate is present in an amount at least sufficient to react stoichiometrically with said sulfur-containing bodies present, calculated as dialkyl sulfate.

References Cited

UNITED STATES PATENTS

| | | | |
|---|---|---|---|
| 2,334,955 | 11/1943 | Putney | 260—683.48 |
| 2,447,530 | 8/1948 | Perkins | 204—190 |
| 2,910,522 | 10/1959 | Gerhold et al. | 260—683.48 |

FOREIGN PATENTS 901,610  7/1962  Great Britain.

OTHER REFERENCES

L. L. Davis, J. M. Jones, C. A. Neilson, American Petroleum Institute Proceedings, May 1938, pp. 70–72 inc.

JOHN H. MACK, *Primary Examiner.*

T. TUFARIELLO, *Assistant Examiner.*